US009684139B2

(12) United States Patent
Chang et al.

(10) Patent No.: US 9,684,139 B2
(45) Date of Patent: Jun. 20, 2017

(54) OPTICAL FIBER CONNECTOR WITH CHANGEABLE GENDER

(71) Applicant: SENKO ADVANCED COMPONENTS, INC., Marlborough, MA (US)

(72) Inventors: Jimmy Chang, Worcester, MA (US); Kazu Takano, Southborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/725,514

(22) Filed: May 29, 2015

(65) Prior Publication Data

US 2016/0349464 A1 Dec. 1, 2016

(51) Int. Cl.
*G02B 6/38* (2006.01)

(52) U.S. Cl.
CPC ......... *G02B 6/3882* (2013.01); *G02B 6/3825* (2013.01); *G02B 6/3826* (2013.01); *G02B 6/3885* (2013.01)

(58) Field of Classification Search
CPC .. G02B 6/3833; G02B 6/3882; G02B 6/3883; G02B 6/3885; G02B 6/3893; G02B 6/38; G02B 6/3825; G02B 6/3826
See application file for complete search history.

(56) References Cited

U.S. PATENT DOCUMENTS

| | | | |
|---|---|---|---|
| 3,721,945 A | 3/1973 | Hults | |
| 6,530,696 B1 * | 3/2003 | Ueda | G02B 6/3893 385/59 |
| 7,036,993 B2 * | 5/2006 | Luther | G02B 6/3846 385/53 |
| 7,077,576 B2 * | 7/2006 | Luther | G02B 6/3821 385/55 |
| 7,264,402 B2 * | 9/2007 | Theuerkorn | G02B 6/3821 385/53 |
| 7,540,666 B2 * | 6/2009 | Luther | G02B 6/3821 385/59 |
| 7,785,019 B2 * | 8/2010 | Lewallen | G02B 6/3817 385/53 |
| 8,534,928 B2 * | 9/2013 | Cooke | G02B 6/3885 385/78 |
| 8,622,634 B2 * | 1/2014 | Arnold | G02B 6/3861 385/60 |
| 8,678,670 B2 * | 3/2014 | Takahashi | G02B 6/3846 385/136 |
| 2002/0191919 A1 | 12/2002 | Nolan | |

(Continued)

OTHER PUBLICATIONS

International Search Report and Written Opinion dated Mar. 30, 2016 from corresponding International Application No. PCT/US15/65479, International Filing Date Dec. 14, 2015.

*Primary Examiner* — John M Bedtelyon
(74) *Attorney, Agent, or Firm* — Pepper Hamilton LLP

(57) ABSTRACT

A multi-fiber, fiber optic connector is interchangeable between a male connector and a female connector by including a pin retainer having a releasable retention device configured to lock the pins in place within the retainer. The retention device may be opened, for example, with a release tool, to free the retention pins for removal of the pins. A method for switching a connector between a male connector configuration and a female connector configuration may be possible as a result of the releasable retention configuration.

8 Claims, 12 Drawing Sheets

(56) References Cited

U.S. PATENT DOCUMENTS

2007/0025665 A1* 2/2007 Dean .................... G02B 6/3869
　　　　　　　　　　　　　　　　　　　　　　385/78
2012/0099822 A1　　4/2012 Kuffel et al.
2013/0170797 A1　　7/2013 Ott
2013/0216185 A1* 8/2013 Klavuhn ............. G02B 6/3882
　　　　　　　　　　　　　　　　　　　　　　385/60

* cited by examiner

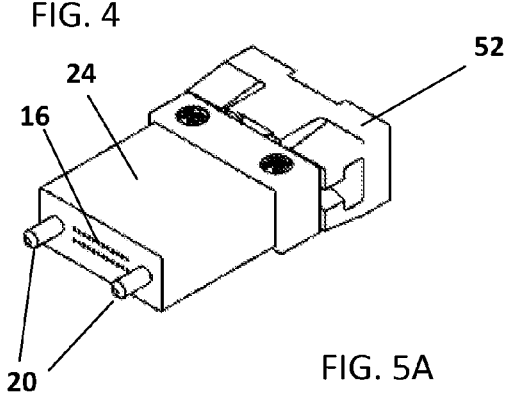
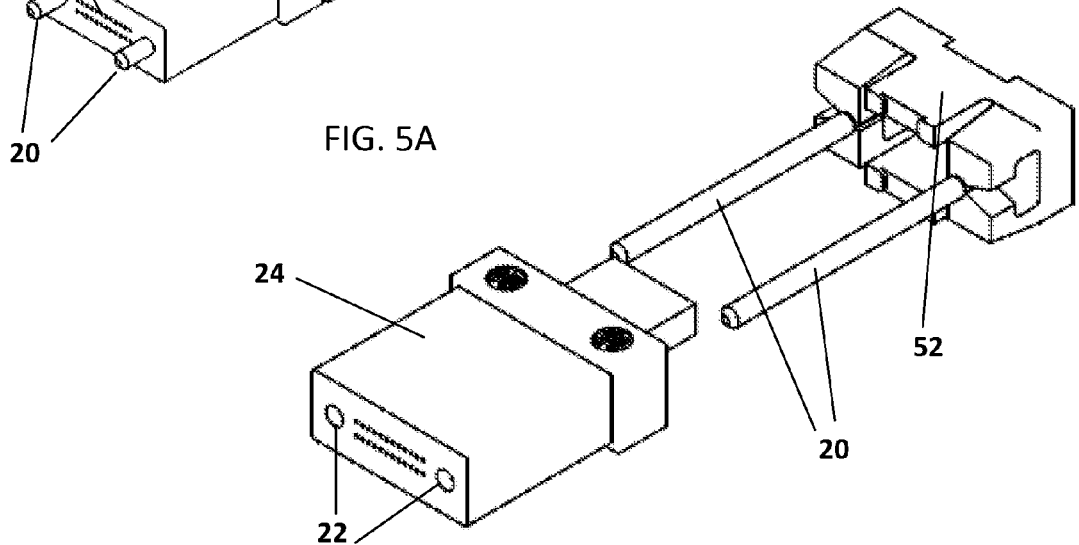
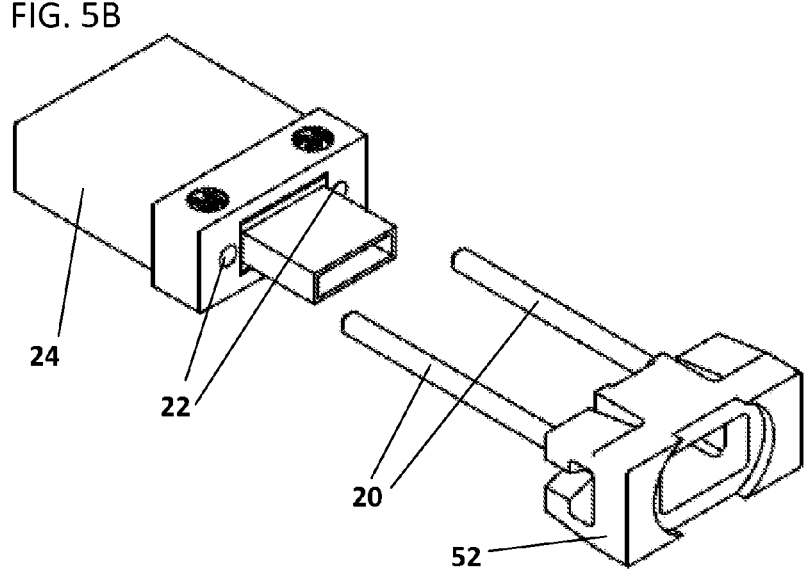

SECTION C-C

SECTION D-D

DETAIL XI

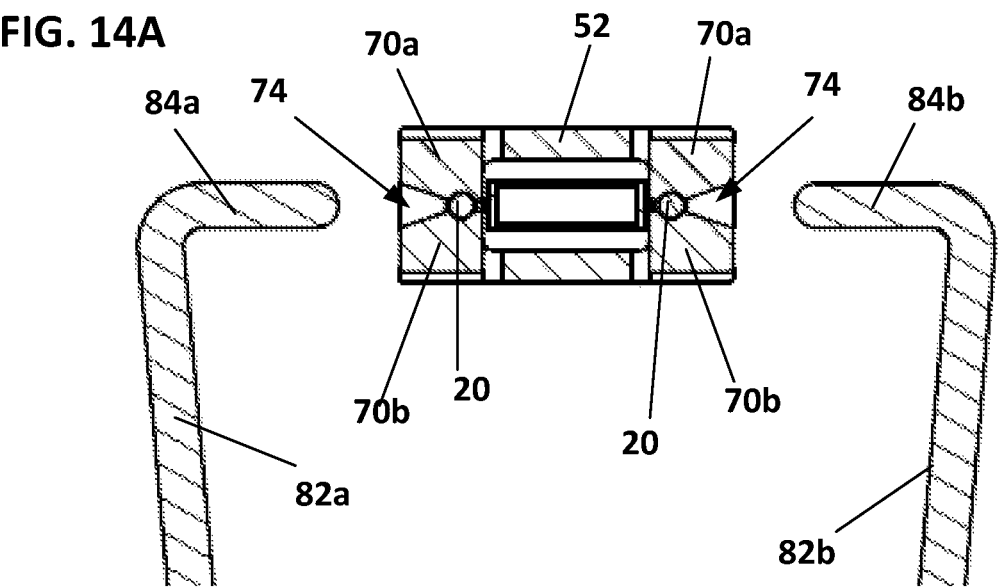
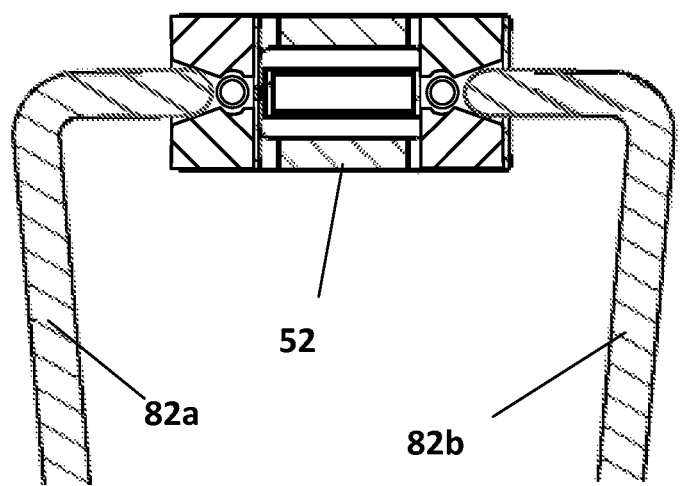

ly small. For
example, even with protective coatings, optical fibers may
be only about 250 microns in diameter (only about 4 times
the diameter of a human hair). As such, hundreds of fibers
can be installed in cables that will take up relatively little
space. For connections between cables, however, the fibers
are terminated with connectors. Multiple fibers may be
arranged within a single connector. For example, multi-fiber
connectors such as those using multi-fiber push-on/pull-off
(MPO) technology may contain and connect 12 or 24 fibers.
Connectors, such as MPO type connectors, generally include
a housing portion that contains a ferrule that terminates the
ends of the fibers. Ferrules are generally used to retain the
ends of the optical fibers for connecting the optical fibers.
One type of optical ferrule that may be used with MPO type
connectors is an MT (Mechanically Transferable) ferrule.

Typically, MPO connectors are joined together to connect
the optical transmission path of one fiber optic cable to
another fiber optic cable or device, and the connection may
be made by inserting the MPO connectors in an MPO
adapter. An adapter generally includes a housing, or portion
of a housing, having at least one port which is configured to
receive and hold a connector to facilitate the optical con-
nection of the connector ferrule with the ferrule of another
connector or other device. Adapters may be used to facilitate
connections contained within a chassis. The term "chassis"
as used herein broadly refers to a containment structure for
housing electrical components or switching components.

MT (Mechanically Transferable) ferrules are optical fer-
rules which are standardized according to JIS C 5981, IEC
61754-5 and the like. The MT ferrules get pushed together
within the adapter to optically connect the ferrules by means
of a so-called PC (Physical Contact) connection, wherein the
optical fibers in one ferrule contact the optical fibers in the
other ferrule and get compressed together to provide an
optical connection. Optical transmission performance
between the optical fibers is strongly dependent on connect-
ing conditions such as axis alignment and inclination of the
optical fibers, and gaps between the opposing optical fibers.

MT ferrules generally use at least two guide pins for
high-accuracy alignment of the optical fibers in the mating
ferrules. An MT ferrule body may include at least two guide
pin holes on the end surface of the ferrule for receiving the
guide pins therein. For a pair of mating connectors, one of
the ferrule bodies of a first connector may be provided with
guide pins in the guide pin holes (generally called the 'male'
connector), and the other ferrule body of a second connector
may have only the guide pin holes (generally called the
'female' connector). As such, a highly accurate mating of the
connectors may be achieved when the guide pins of the male
connector are disposed within the guide pin holes of the
female connector.

The gender, male or female, designation of a connector
may often be typically predisposed during manufacturing of
the connector, wherein connectors may be manufactured to
be either male or female. Such connectors may be pre-
installed on cable ends, and care must be taken so that the
cables are all installed in the proper direction so that mating
of male and female ends may possible. Alternatively, for
on-site installation, a connector may be assembled onto a
cable end, and during assembly the installer may install pins
or a pin component into a ferrule body to provide a male
connector, or alternatively, leave such pieces absent to
provide a female connector.

For installations wherein the gender may accidentally end
up being incorrect, or installations where the gender may
need to be changed for one reason or another, such as a
renovation or installation of a gender specific component,
the gender of typical connectors is not changeable, or only
changeable after disassembly and reassembly in the opposite
designation. As such, for predetermined gender connectors,
an entire connector may need to be removed and essentially
scrapped, for replacement by an opposite gender connector,
or for connectors requiring disassembly and reassembly,
much time may be wasted in the re-gendering process.

Therefore, there remains a need for multi-fiber, fiber optic
connectors that have the flexibility of easily changing the
gender of the connector on site.

SUMMARY

A multi-fiber, fiber optic connector may include remov-
able guide pins for changing the gender of the connector.
The connector may be configured to releasably retain the
guide pins therein. The guide pins may be insertable into the
connector to convert the connector from a female connector
to a male connector. Once inserted, the guide pins may be
retained, or locked in place with a retention configuration.
To convert from male to female, the retention configuration
may be opened to release the guide pins, and the guide pins
may be removed from the connector.

In an embodiment, a multi-fiber fiber optic connector
interconvertible between a male connector and a female
connector, includes a ferrule comprising a plurality of opti-
cal fibers supported therein and terminating at a first end of
the ferrule for alignment with optical fibers of an additional
device, at least two spaced apart passages disposed along at
least a portion of the ferrule and configured for receiving
alignment pins therein, a pin retainer configured for releas-
ably retaining the alignment pins in a the connector when the
alignment pins are disposed in the passages, and a housing
disposed around the pin retainer and at least a portion of the
ferrule. The pin retainer includes a portion for engaging each
alignment pin to retain the alignment pins in the connector
for a male configuration, wherein the portion for engaging is
selectively releasable from the alignment pins for removal of
the alignment pins for a female configuration.

In an embodiment a pin retainer for a fiber optic connector
includes a body portion for being disposed with a ferrule in
the connector, an at least one selectively displaceable lock-
ing member configured for locking an alignment pin with
the body portion, wherein the selectively displaceable lock-
ing member has a first position for engaging an alignment
pin to lock an alignment pin with the body portion, and a
second position displaced from the first position for release
of an alignment pin locked with the body portion.

In an embodiment a method for interconversion of a fiber
optic connector between a male configuration with at least
one alignment pin, and a female configuration with at least
one passage for receiving an alignment pin is provided. The
connector includes at least one selectively displaceable
locking member for locking at least one alignment pin therein, and the method includes, for converting a female configuration to a male configuration, slidably inserting at least one alignment pin into engagement with the selectively displaceable locking member to lock the alignment pin into the connector, and for converting a male configuration to a female configuration, releasing the selectively displaceable locking member from the alignment pin, and slidably removing the alignment pin from the connector.

BRIEF DESCRIPTION OF THE FIGURES

FIG. 4 is a perspective view of a ferrule and a pin retainer according to an embodiment.

FIGS. 5A and 5B are front and rear exploded perspective views of the ferrule and the pin retainer of FIG. 4.

FIGS. 14A and 14B are sectional views showing use of a tool to release the pins according to an embodiment.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

Figure 1A:
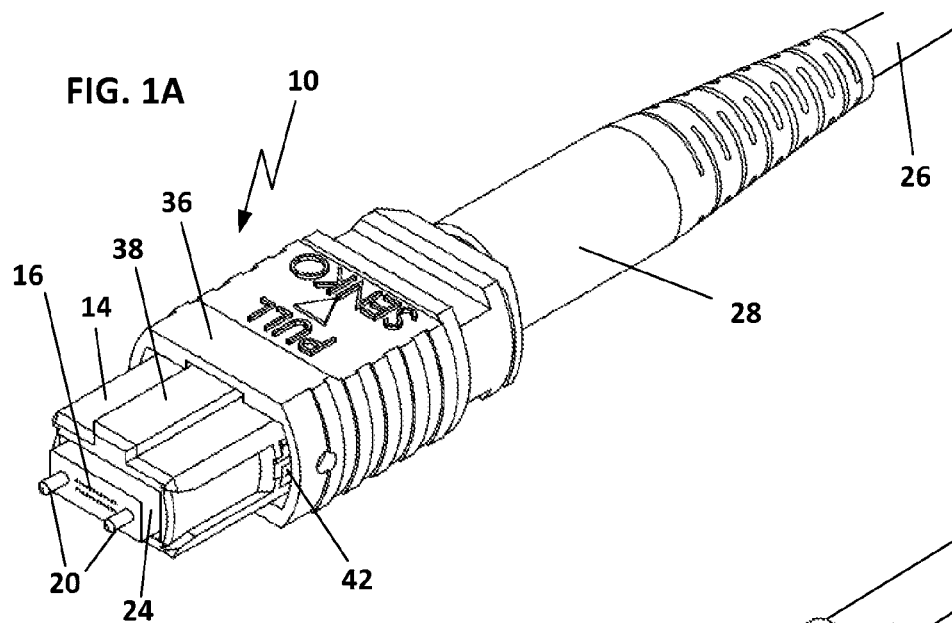
FIGS. 1A and 1B depict male and female configurations of an MPO connector according to an embodiment.
Figure 1B:
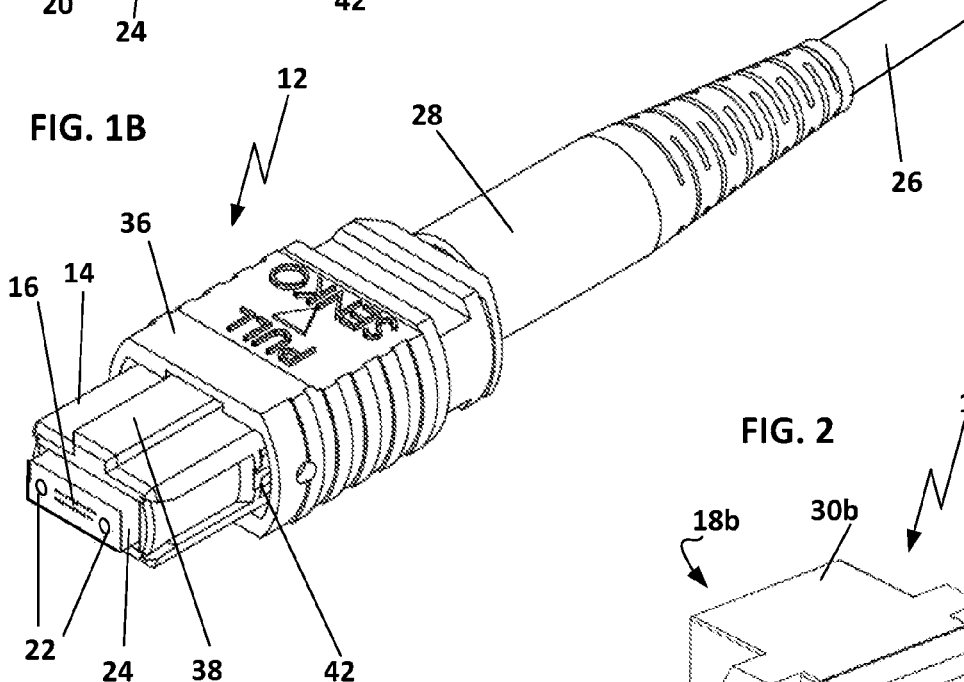
Figure 2:
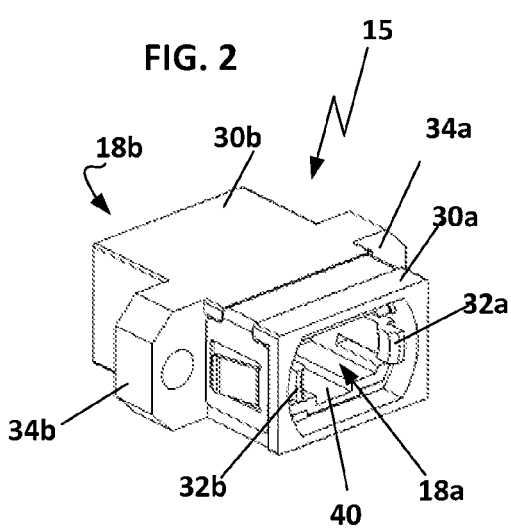
FIG. 2 depicts an MPO adapter as generally used for mating MPO connectors of FIGS. 1A and 1B.
Figure 3:
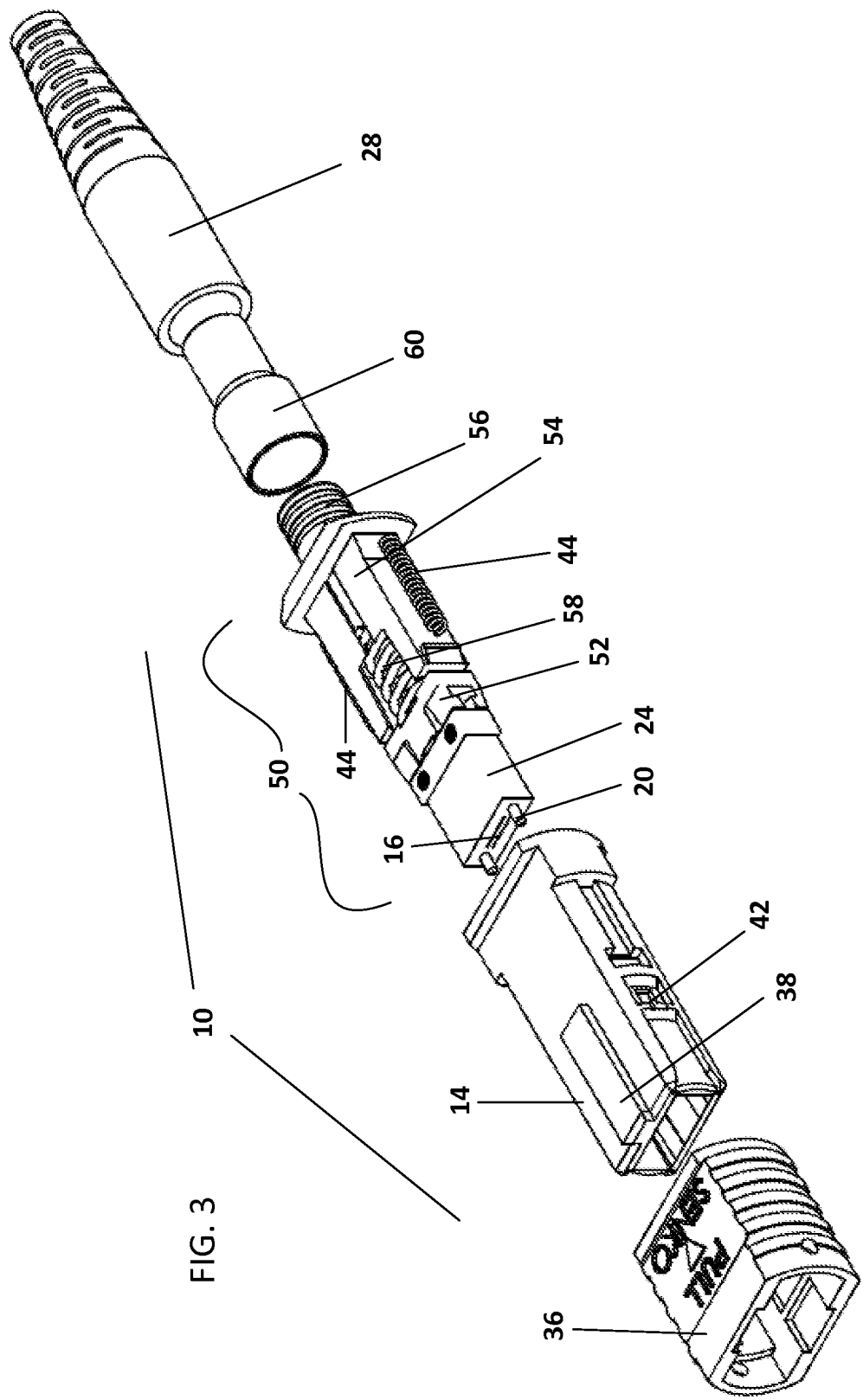
FIG. 3 is an exploded view of a male connector according to an embodiment.

For connection of cables together or with other fiber optic devices, the terminal ends of a cable may include a male connector 10 or female connector 12 as represented in FIGS. 1A and 1B, respectively, or in exploded view of FIG. 3. A connector 10, 12 may include a housing structure 14 configured to interact with and connect with an adapter 15 as represented in FIG. 2. An adapter 15, in a simple form, may include two aligned ports 18a, 18b for aligning fiber optic connectors 10, 12 therein to align and connect optical fibers 16 end-to-end. For proper alignment, the connectors to be aligned generally include one male connector 10 and one female connector 12. The male connector 10 generally includes at least two guide/alignment pins 20 that fit into the guide/alignment holes 22 of the female connector 12, thereby essentially ensuring proper alignment of the optical fibers 16 of the two connectors when mated end to end. As described herein, the connectors 10, 12 and adapters 15 may be considered multi-fiber connectors and multi-fiber adapters.

While the following description is directed towards MPO adapters and MPO connectors with MT optical ferrules, the embodiments described may be applicable to other adapters, connectors and ferrule types as well. An embodiment of an MPO connector 10, 12 may include a ferrule 24 that may be a multi-fiber ferrule as shown at a first end of the connector. In addition, the connector 10 may have attached thereto, a fiber optic cable 26 and cable boot 28 that may extend from a second end of the connector.

An adapter 15 may include a first end 30a having a first plug-in port 18a for receiving the ferrule end of an optical fiber connector 10, 12 therein, and may include a second end 30b having an additional plug-in port 18b (not visible) for receiving an additional optical fiber connector, or other type of fiber optic device therein.

For retention of an MPO connector 10 within each of the ports 18a, 18b, the ports may be provided internally with a connector clip that may be formed by the two resilient tabs 32a, 32b. The tabs 32a, 32b may be configured to be displaceable outwardly for insertion and removal of a connector 10, 12 into or out of the ports 18a, 18b, and may return to essentially their original position to engage and retain a connector in the ports. Adapters 15 may be configured to be mounted on a chassis panel, and may include mounting flanges 34a, 34b to mount the adapter via screws, for example.

A connector 10, 12 may include an inner housing 14 that may surround the ferrule 24. A connector 10, 12 may also include a displaceable outer housing member 36 that may be slidably disposed about the inner housing 14 adjacent the second end of the connector 10, 12. To provide for a pre-determined alignment of the fiber optic cables within the adapter 15, the inner housing 14 may include an alignment key 38 that is configured to fit within keying slot 40 of the adapter. Inner housing 14 may slide into port 18a (for example) until tabs 32a, 32b engage into slots 42 of the inner housing. The outer housing 36 may be moved towards the second end to allow the tabs 32a, 32b to engage into slots 42, and to retain the tabs in the slots, the outer housing may be slid back towards the first end and over the tabs within the port 18a. The outer housing 36 may be biased towards the first end via springs 44, as shown for example in FIG. 3, or alternative types of biasing devices.

A male connector 10 is depicted in exploded view in FIG. 3. In an embodiment as shown, the ferrule 24, as part of a terminal cable assembly 50, may fit within the inner housing 14. The assembly 50 may also include a guide pin retainer 52 (described in more detail below), a terminal housing 54 to which the cable 26 attaches via the terminal post 56. A biasing member, such as a spring 58 may be disposed between the terminal housing 54 and the pin retainer 52 to bias the ferrule 24 forwardly within the inner housing 14. Such biasing provides a biased mating of ferrule ends and optical fibers 16 when connectors 10, 12 are mated in an adapter 15 to thereby hold the mated ferrule ends and optical fibers in contact with one another.

A fiber optic cable 26 as shown in FIGS. 1A, 1B may be retained with the back post 56 by means of a crimp sleeve 60, or other type of detainment connector. A connector such as sleeve 60 may be crimped to the back post as well as to a cable sheathing of the cable 26 to thereby prevent the cable from being pulled away from the terminal housing 54.

A more detailed view of the ferrule 24 and pin retainer 52 are represented in FIGS. 4, 5A and 5B. As represented, the ferrule 24 may include at least two pin receiving holes or passages 22 that extend through the body of the ferrule. Guide pins 20 may be attached with the pin retainer 52, and may be slidably inserted into the holes 22 from the rear end of the ferrule 24 to provide a male ferrule assembly as represented in FIG. 4, for a male connector 10 as represented in FIG. 1A. For a female connector 12, as represented in FIG. 1B, the pin connector 52 may be used alone, without the attached guide pins 20, thereby leaving the holes 22 open for mating with guide pins of a male connector 10.

In an embodiment as represented in FIG. 6 and FIGS. 7A-7D, the pin retainer 52 may be configured so that the guide pins 20 may be insertable into, and removable from the pin retainer. For each guide pin 20, the pin retainer may include a pin retention configuration, which may include a clip formed from a pair of opposed arms 70a, 70b. The arms 70a, 70b may define a retention space 72 therebetween into which a guide pin 20 may be disposed. The retention space may be cylindrical and may have a diameter ($d_1$) that corresponds with a reduced diameter notch 20b formed in the guide pin 20. The notch 20b may have a diameter ($d_2$) that is less than the diameter ($d_3$) of the guide pin 20 at least adjacent each side of the notch.

The arms 70a, 70b may be configured to have a degree of resilience sufficient to allow the arms to move away from one another by an amount sufficient to allow a guide pin 20 to be inserted between the arms, and once the guide pin is inserted, have the arms return to their original position to retain the guide pin in place.

Figure 6:
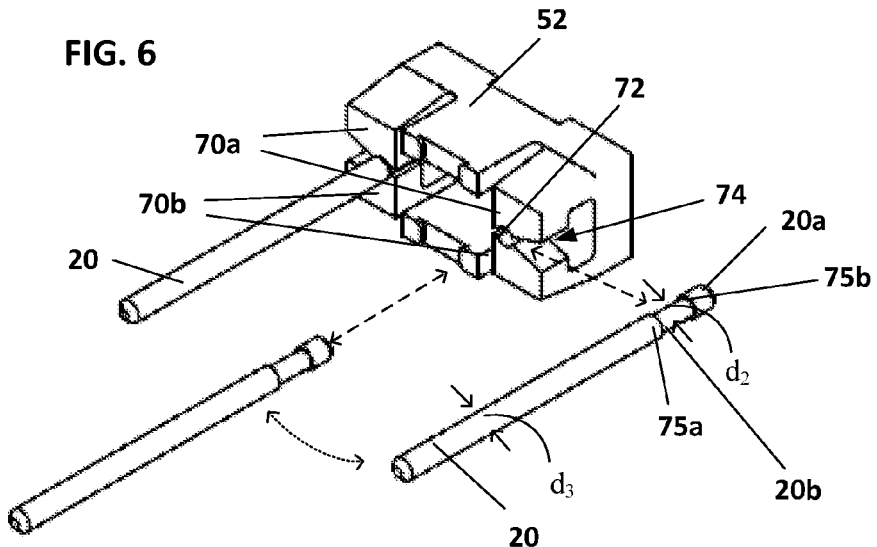
FIG. 6 is a perspective view of a pin retainer and guide pins according to an embodiment.
Figure 7A:
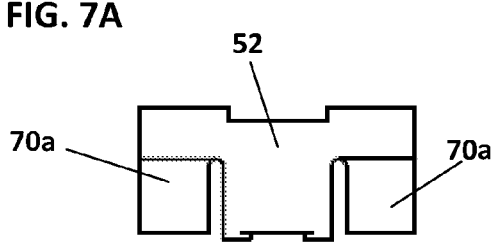
FIGS. 7A-7D are top, side, front and rear face views of a pin retainer according to an embodiment.
Figure 7B:
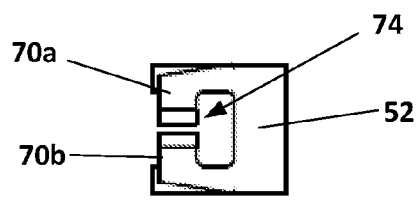
Figure 7C:
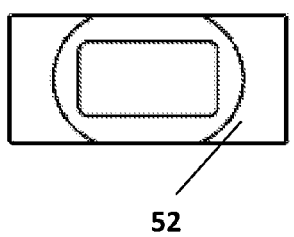
Figure 7D:
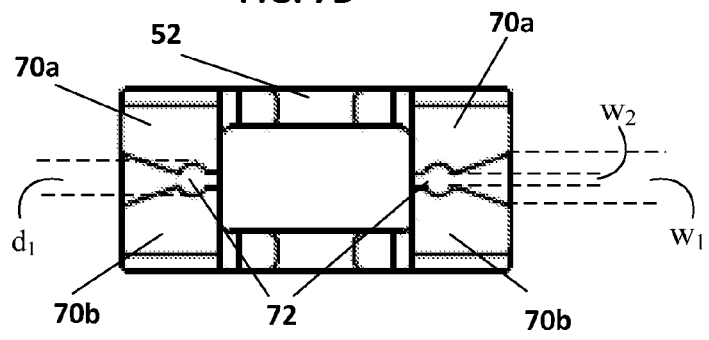

As represented by the dashed line in FIG. 6, a guide pin 20 may be laterally inserted into the retention space 72. The arms 70a, 70b may define a tapered groove 74 that has a first width ($w_1$) at the exterior lateral side of the pin retainer 52, and tapers to a second width ($w_2$) adjacent the retention space 72. The first width ($w_1$) may be greater than the diameter ($d_2$) of the pin 20 in the notch 20b, and the second width ($w_2$) may be less than the diameter ($d_2$) of the pin in the notch, and the diameter ($d_2$) of the pin in the notch 20b may correspond essentially to the diameter ($d_1$) of the retention space 72. As the pin 20 is laterally inserted into the groove 74, the pin will move into the groove and first engage the arms 70a, 70b. The pin 20 may then be pressed further inward, displacing the arms 70a, 70b away from one another until the pin passes between the arms and moves into the retention space 72, at which point, the arms may return towards their original position and retain the pin therebetween, with the pin notch 20b, disposed in, and retained within the retention space.

Alternatively, a guide pin 20 may be inserted axially into the retention space 72 between the arms 70a, 70b. An insertion end 20a of the guide pin 20 may be tapered so that, as the guide pin is moved axially into the retention space 72, the tapered end 20a forces the arms 70a, 70b apart to the point wherein the guide pin may fit therebetween. The guide pin may then be further inserted until the notch 20b is disposed between the arms 70a, 70b, wherein the arms may return towards their original position and retain the pin therebetween.

Both axial ends of the notch 20b may be defined by a radial (orthogonal) edge 75a or 75b, extending from the reduced diameter ($d_2$) of the notch to the diameter ($d_3$) of the pin 20. As such, axial movement of the pin 20 out of the retention space may be prevented. For axial or lateral removal of the pin 20, the arms 70a, 70b need to be forced apart, as discussed further below, to create an opening of a size sufficient to allow the pin to pass therethrough. If, in an embodiment, the edge 75b were instead tapered from the reduced diameter ($d_2$) of the notch 20b to the diameter ($d_3$) of the pin 20, in a direction the end 20a, application of an axial pulling force to the pin may allow for the pin to be axially withdrawn from the pin holder 52 as the taper would slide between the arms 70a, 70b and open the arms as the pin was withdrawn. However, to prevent tampering, or unauthorized removal of the pins 20, a preferred embodiment requires the use of a tool, as discussed below with reference to FIGS. 12, 13A, 13B, 14A and 14B, for example, to force open the retaining arms 70a, 70b.

Figure 8A:
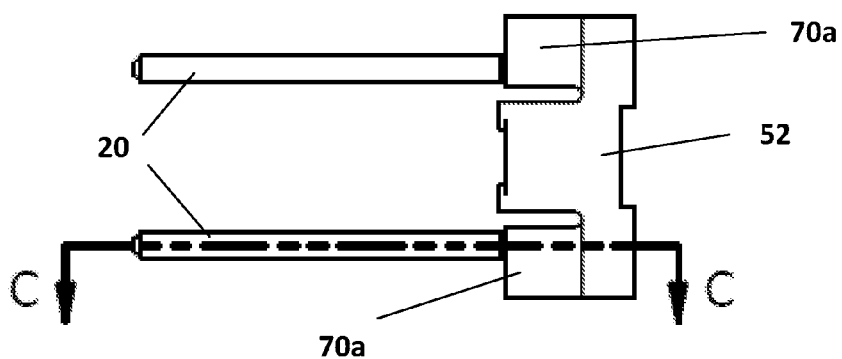
FIGS. 8A-8D provide top, side and sectional views of a pin retained with a pin retainer according to an embodiment.
Figure 8C:
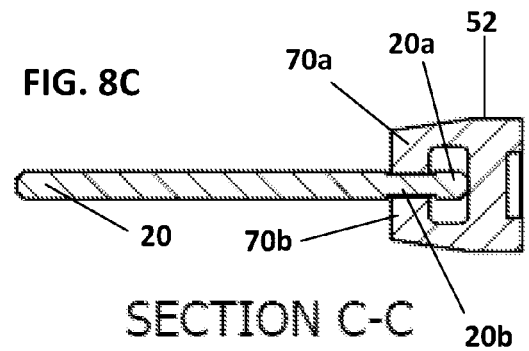
Figure 8B:
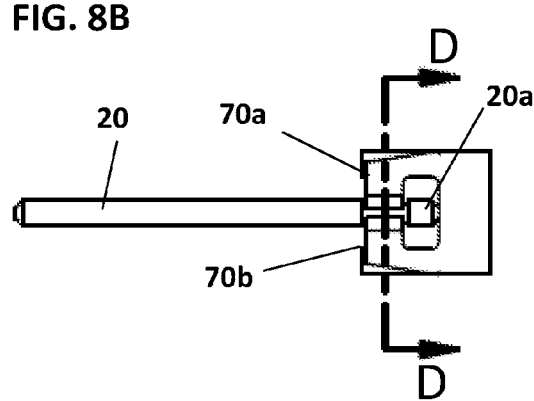
Figure 8D:
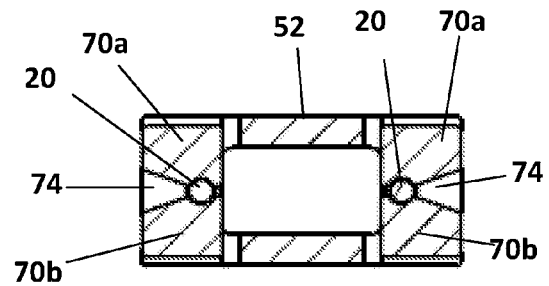

FIGS. 8A-8D provide top and side views, as well as sectional views of a pin 20 retained with a pin retainer 52. FIG. 8C depicts a longitudinal section through the pin 20 and retainer 52 of an embodiment as represented in FIG. 8A. As shown, the pin 20 may be axially retained within the retainer 52. FIG. 8D depicts a transverse section through the pin 20 and retainer 52 of an embodiment as represented in FIG. 8B. As shown, the pin 20 may be laterally retained within the retainer 52.

Figure 9:
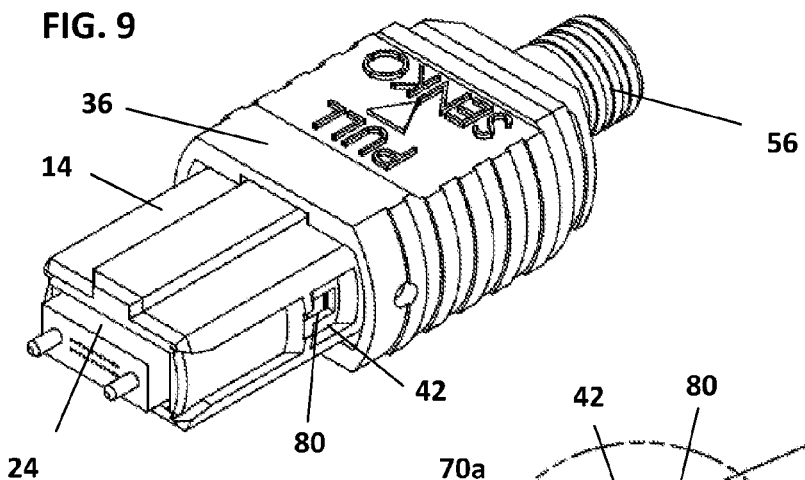
FIG. 9 depicts a perspective view of a male connector with its outer housing pulled back to show the release slots according to an embodiment.
Figure 10:
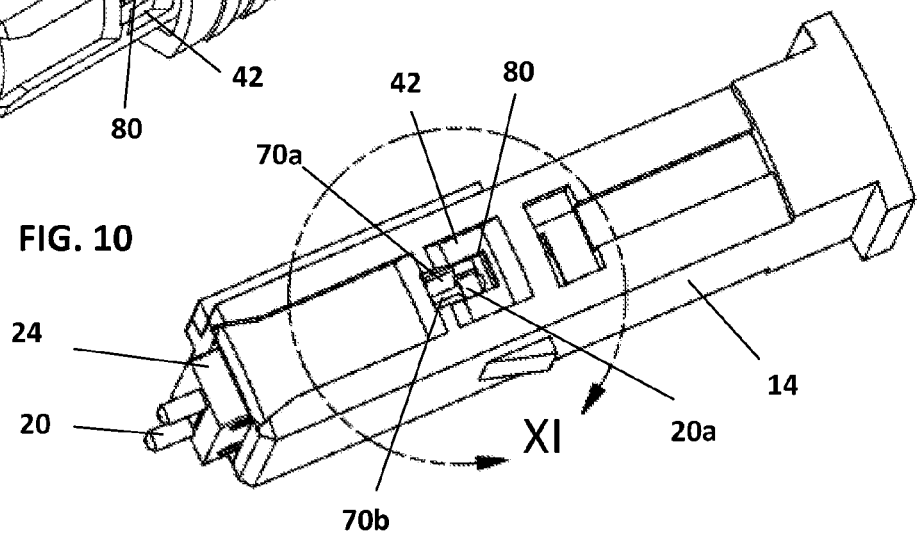
FIG. 10 provides a side view of the inner housing showing the release slots according to an embodiment.
Figure 11:
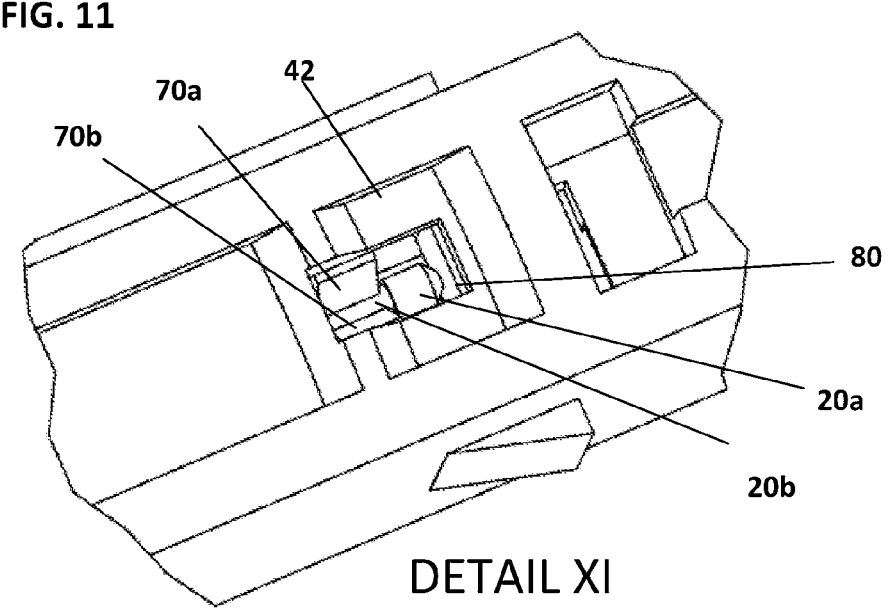
FIG. 11 is a detailed view of the release slots shown in FIG. 10 according to an embodiment.
Figure 12:
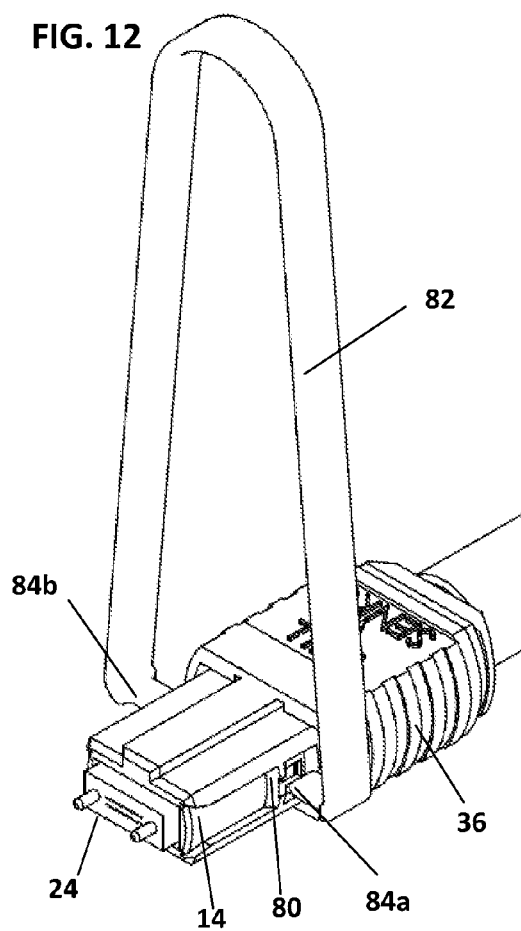
FIG. 12 shows a tool and placement thereof relative to the release slots according to an embodiment.

As represented in FIG. 9, to provide a fiber optic connector that may be changed from male (with pins 20) to female (without pins 20) access to release the pins may be provided via passages 80 that may be provided in the sides of the inner housing 14. In an embodiment as shown, the passages 80 may be provided within the slots 42. As represented in FIG. 9, in comparison to the view provided by FIG. 1A, the outer housing 36 may be moved rearwardly away from the front end of the connector to expose the slots 42 and passages 80. The passages 80 may be configured to provide access to the arms 70a, 70b through the walls of the inner housing 14.

The passages 80 may be configured to accommodate a release tool 82 as depicted in FIGS. 12-14B. In an embodiment, the release tool 82 may be configured to include at least two nibs 84a, 84b that fit through the passages 80, one on each side of the inner housing 14, so that, when forced inwardly through the passages, push the arms 70a, 70b apart by an amount sufficient to release the pins 20 from the pin retainer 52. FIG. 13B depicts a general positioning of a tool 82 and nibs 84a, 84b relative to a connector 10 with the outer housing 36 displaced rearwardly for removal of the pins 20.

Figure 13A:
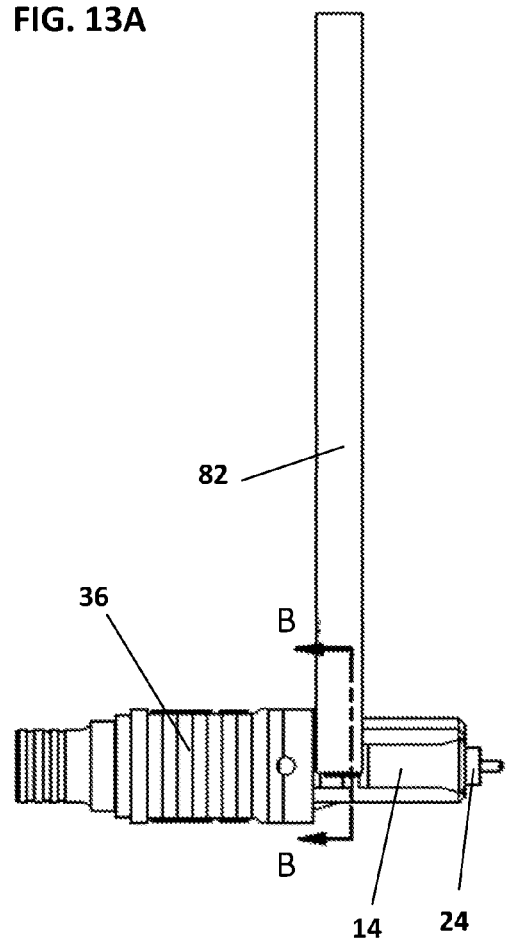
FIGS. 13A-13B are side and sectional views of the embodiment of FIG. 12 according to an embodiment.
Figure 13B:
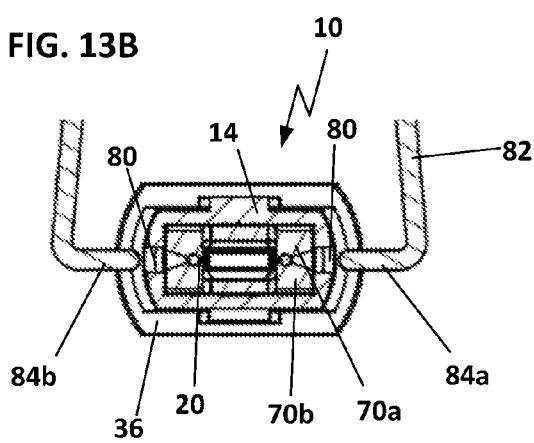

For clarity, FIGS. 14A and 14B reproduce only the pin retainer 52, pins 20, and a portion of the tool 82 of FIG. 13B. As shown in FIGS. 14A and 14B, the tool nibs 84a, 84b may be aligned with the tapered groove 74 between the arms 70a, 70b. In an embodiment, the tool arms 82a, 82b may be squeezed towards one another to move the nibs 84a, 84b into the tapered groove 74 and between the arms 70a, 70b to displace the arms away from one another and away from the pins 20 as represented in FIG. 14B. After the arms 70a, 70b are sufficiently displaced, the pins 20 may be removed from the pin retainer 52 and from the connector 10 to change the connector from a male connector 10 (FIG. 1A) to a female connector 12 (FIG. 1B).

Alternatively, a female connector 12 may be converted to a male connector 10 by inserting the tapered ends 20a of the pins 20 into the guide/alignment holes 22, and pushing the pins inwardly into the pin retainer 52. Because of the tapered configuration of the ends 20a of the pins 20, the ends 20a may force the retainer arms 70a, 70b apart to make it possible for the pins to enter between the arms. When the pin notch 20b passes into the retention space 72 between the arms, the arms may return to their original position to lock the pins in place. If desired, to facilitate insertion of the pins 20 into the retainer 52 the tool 82 could be used to open the arms 70a, 70b thereby making it possible to insert the pins with less force on the pins.

Figure 15A:
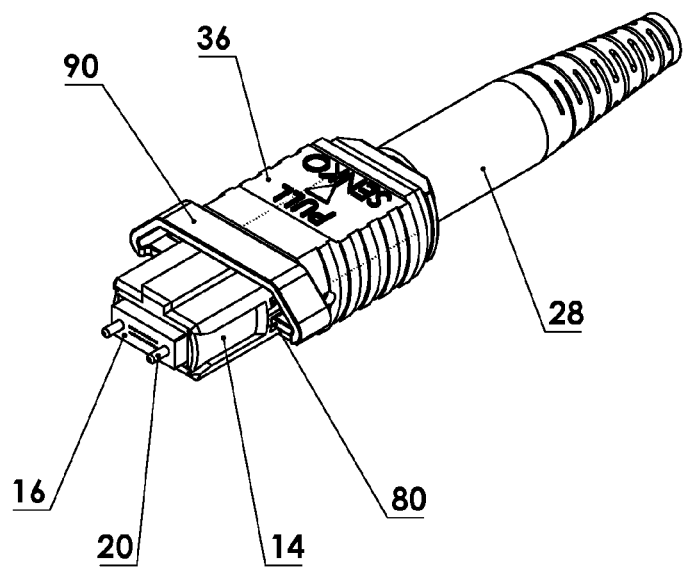
FIGS. 15A and 15B show an alternative tool configuration according to an embodiment.
Figure 15B:
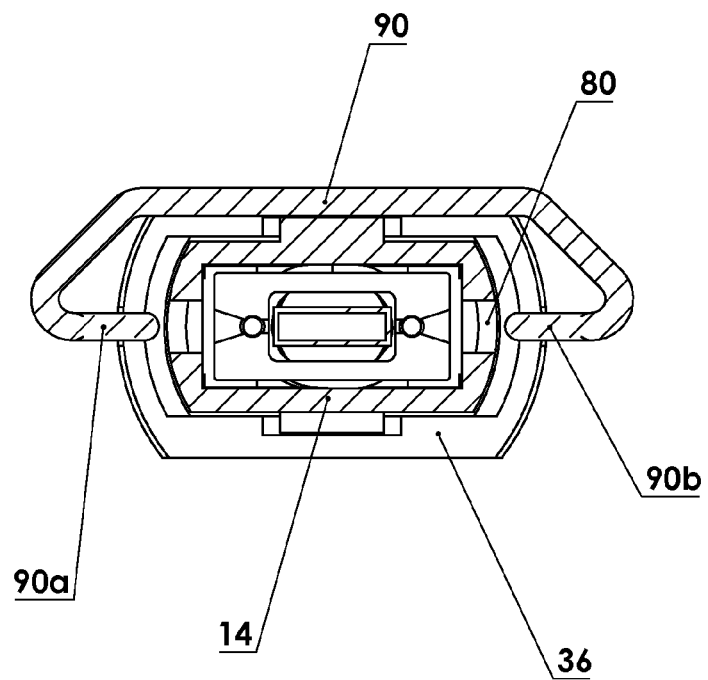

An alternative embodiment of a release tool 90 is depicted in FIGS. 15A and 15B. As shown, the release tool 90 may be more compact while maintaining nibs 90a, 90b in a configuration appropriate for entering the passages 80. While two variants of a release tool are shown, other configurations within the general skill of the artisan may also be provided. In an embodiment (not shown directly, but a variant of which is provided below) a separate tool may not be needed if the inner housing was configured with release tabs that are integral with the housing and include nibs that project partially into the tapered groove 74. A user may then simply squeeze the sides of the connector at the corresponding tabs to press the nibs further in the groove 74 to displace the arms 70a, 70b.

An alternative embodiment of a pin retainer 152 and associated release tool 182 are represented in FIGS. 16A-16D. Instead of having lateral tapered grooves 74 like the embodiment of retainer 52, the retainer may be configured to include tapered grooves 174 that extend from a top or bottom surface of the retainer. Arms 170a may be displaceable laterally away from a central core 175. In essentially the same manner as previously discussed with reference to the earlier embodiments, the pins 20 may be retained within the retainer 152, but between displaceable arms 170a and the central core 175. For converting a female connector to a male connector, the pins 20, because of the tapered ends 20a, may be pushed into the retainer 152 so that as the tapered ends are pushed between the arms 170a and the central core 175, the arms may be forced away from the central core.

To convert from a male connector to a female connector, a release tool, such as tool 182 may be used to force the arms 170a laterally away from the central core 175 to open the retainer and provide clearance for the pins 20 to be released from the retainer. In an embodiment (not shown), the tool 182 may be a separate tool carried by the user, and the inner housing may include a corresponding opening, openings 115 for accommodating the tool so that the nibs 190a, 190b may be inserted through the housing to displace the arms 170a.

Figure 16A:
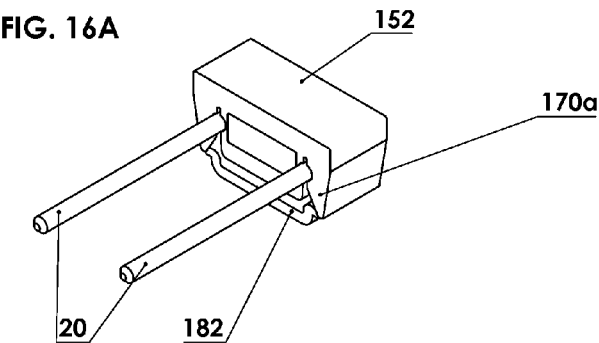
FIGS. 16A-16D show an alternative configuration of a pin retainer according to an embodiment.
Figure 16B:
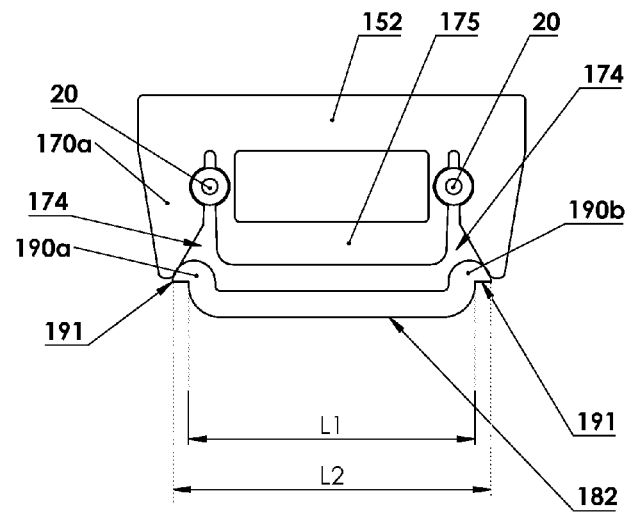
Figure 16C:
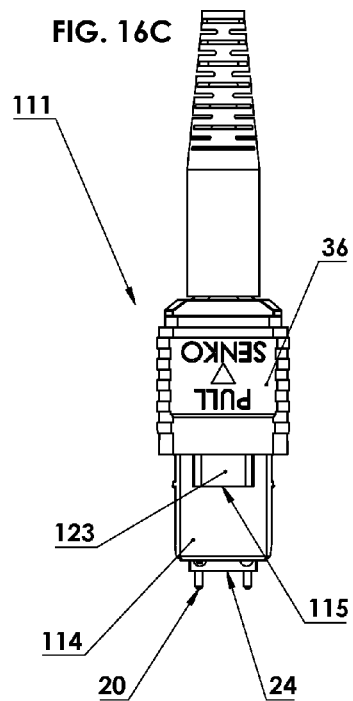
Figure 16D:
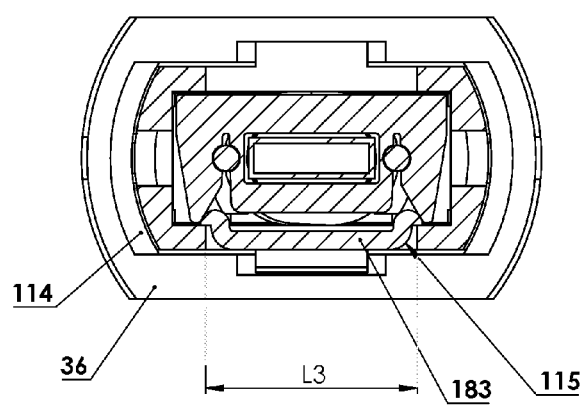

In an alternative embodiment, as shown in FIGS. 16C and 16D, the tool 182 may be separate from the housings and retainer, but included as a component of the connector 111. As represented in FIG. 16B, the tool 182 may include a body portion 183 from which the nibs 190a, 190b project. The tool 182 may include projecting hooks 191 that extend laterally away from the nibs 190a, 190b and body portion 183, such that the body portion may define a first length ($L_1$) and the hooks define a second length ($L_2$) that is greater than the first length ($L_1$). The inner housing 114 may include an opening 115 that accommodates the body portion 183. The opening 115 may have a width that is essentially the same as, or slightly greater than a width of the body portion 183, and a length ($L_3$) that is essentially the same as or slightly greater than the length ($L_1$), but less than the length ($L_2$). With such a configuration of the tool 182, the hooks 191 will not fit through the opening 115 so that the tool 182 is retained within the inner housing. The tool body portion 183 may have flexibility and resiliency to allow the tool 182 to be bent for insertion through the opening. For example, a first side with nibs 190a may be inserted through the opening 115, the tool can be bent to reduce the length ($L_3$) to fit through the opening, and the second end with nibs 190b may be inserted into place wherein the tool may then return to its original configuration as shown.

Application of an inward pressure on the body portion 183 may force the nibs 190a, 190b inwardly into the tapered grooves 174 to press arms 170a, 170a outwardly away from the central core 175, thereby providing clearance between the pins 20 and the arms to allow the pins to be removed in a similar manner as to that shown and discussed with reference to FIG. 14B. While not shown in the drawings, the outer housing 36, when in its forward position (shown displaced rearwardly in FIG. 16C), may completely cover, or alternatively cover a substantial portion of the tool body portion 183 and opening 115 to prevent an accidental force on the body portion from releasing the pins 20.

Figure 17A:
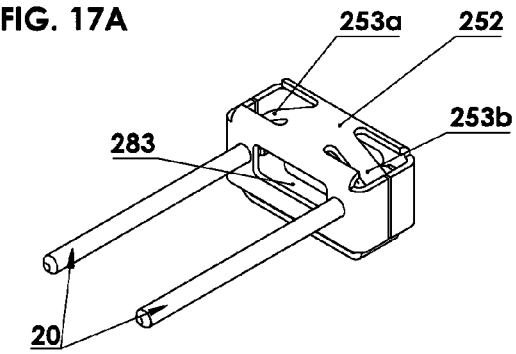
FIGS. 17A-17D show an alternative configuration of a pin retainer according to an embodiment.
Figure 17C:
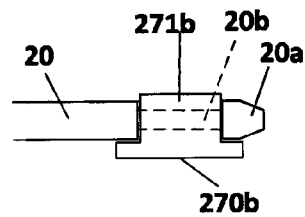
Figure 17B:
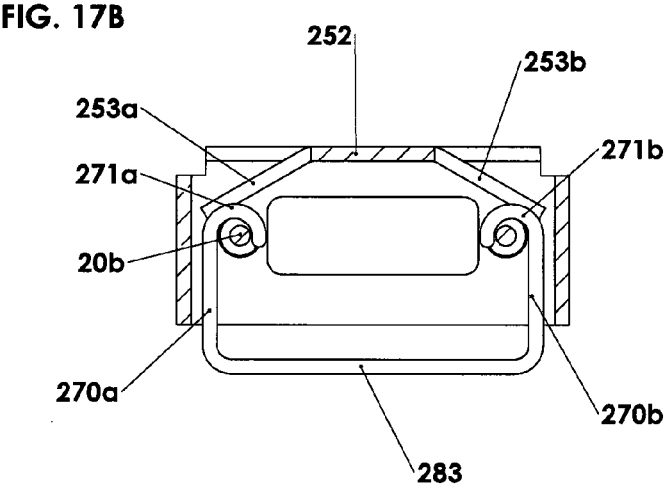
Figure 17D:
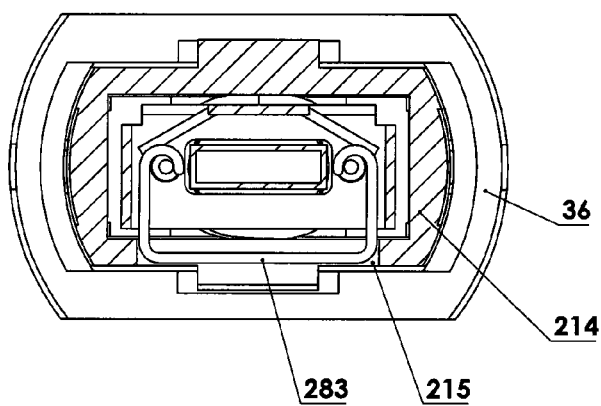

An alternative configuration of a pin retainer 252 is represented in FIGS. 17A-17D. In an embodiment, a U-shaped retention clip 283 may include J-shaped hooks 271a, 271b at the ends of arms 270a, 270b. The J-shaped hooks 271a, 271b may be configured to curl into, or fit into the pin notches 20b so that, when disposed in the notches, the pins 20 will be held within the pin retainer 252. FIG. 17C represents a top view looking down at a J-hook 271b and pin 20 from the top of the configuration of FIG. 17B. The pin retainer 252 may include resilient spring arms 253a, 253b configured to apply pressure to the J-hooks 271a, 271b to retain the J-hooks in the notches 20b. With reference to FIG. 17B, resilient spring arms 253a, 253b, may apply a downward pressure on J-hooks 271a, 271b to hold the J-hooks in the notches 20b (shown in cross-section).

To release pins 20, an upward force against the spring arms 253a, 253b may be applied to the clip 283 so that arms 270a, 270b move the J-hooks 271a, 271b upwardly and out of the notches 20b. This will free the pins 20 so that the pins may be removed from the pin retainer 252. Upon removal of the pins 20, the spring arms 270a, 270b may return to their original position pushing the J-hooks 271a, 271b downwardly. As for previous embodiments, to insert pins 20 into the retainer 252, the tapered ends 20a may be inserted in and forced under the J-hooks 271a, 271b to move the J-hooks upwardly against the force of spring arms 253a, 253b until the notches 20b are aligned with the J-hooks, at which time the J-hooks will be forced downwardly into the notches under the force of the spring arms.

As shown in cross-section in FIG. 17C, the inner housing 214 may include an opening 215 for access (which could resemble the opening 115 as shown in FIG. 16C) to press inwardly on the clip 283. While not shown in the drawings, the outer housing 36, when in its forward position may completely cover, or alternatively cover a substantial portion of, the clip 283 and opening 215 to prevent an accidental force on the body portion from releasing the pins 20.

In an alternative embodiment, spring arms 253a, 253b could be configured to fit into the notches 20b to engage with the pins 20 and retain the pins in the retainer 252 instead of the J-hooks. A U-shaped, or alternative configuration tool (not shown), for example a U-shaped tool essentially resembling the clip 283, but without the J-hooks may be configured to release the pins 20. The tool may be separate from the connector housing, or included as a part of the connector housing, and may be configured to be pushed into the housing to engage the spring arms 253a, 253b and move the spring arms away from and out of the notches 20b to release the pins 20.

Figure 18A:
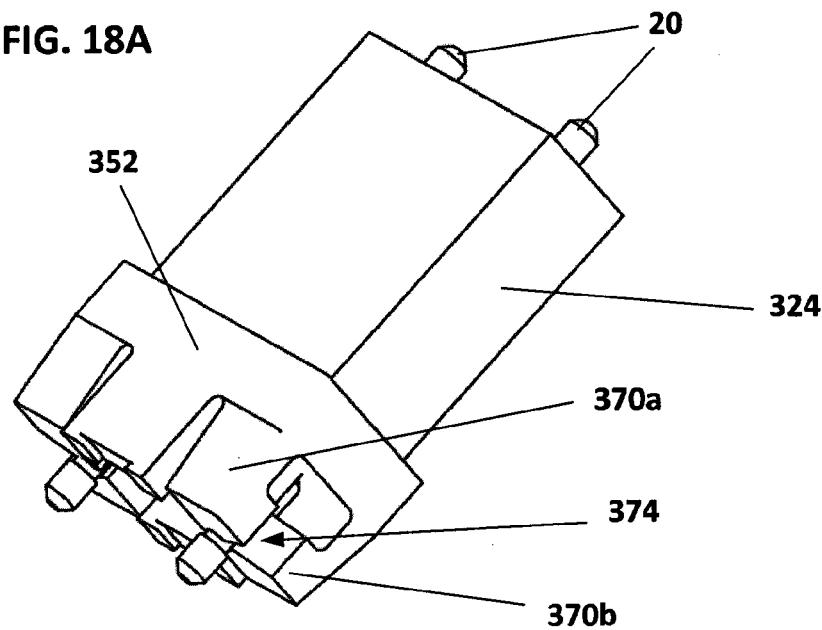
FIGS. 18A-18B show a one-piece housing and pin retainer according to an embodiment.
Figure 18B:
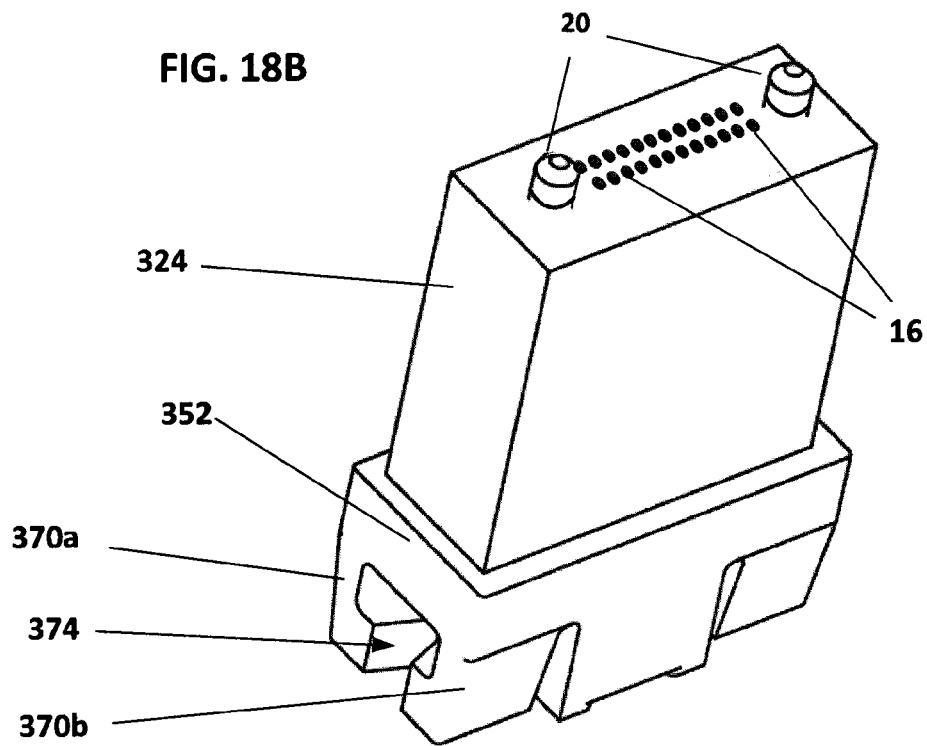

As represented in FIGS. 18A and 18B, a pin retainer 352 may be configured integral with the inner housing 324 to form a one-piece housing unit (compared with the configuration of FIG. 4). In an embodiment, the arms 370a, 370b may be configured similar to arms 70a, 70b as previously discussed, for example with reference to FIG. 6. Arms 370a, 370b may define a tapered notch 374 therebetween, and a tool, such as tool 82 (FIG. 12) may be used to open the arms for release of pins 20.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A multi-fiber fiber optic connector interconvertible between a male connector and a female connector, the connector comprising:
    a ferrule comprising:
        a plurality of optical fibers supported therein and terminating at a first end of the ferrule for alignment with optical fibers of an additional device;
        at least two spaced apart passages disposed along at least a portion of the ferrule and configured for receiving alignment pins therein;
    a pin retainer configured for releasably retaining the alignment pins in the connector when the alignment pins are disposed in the passages; and
    a housing disposed around the pin retainer and at least a portion of the ferrule;
    wherein the pin retainer comprises a portion for engaging each alignment pin to retain the alignment pins in the connector for a male configuration, and the portion for engaging being selectively releasable from the alignment pins for removal of the alignment pins for a female configuration, the housing and pin retainer being configured for interconversion of the connector between the male configuration and the female configuration without disassembly of the housing from the connector.

2. The connector of claim 1, wherein the housing and pin retainer are further configured for interconversion of the connector between the male configuration and the female configuration without disassembly of the pin retainer from the connector.

3. The connector of claim 1, wherein:
    the portion for engaging has a first position for engaging the alignment pin and a second position spaced from the alignment pin;
    the portion for engaging is movable from the first position to the second position under a force applied to the portion for engaging; and
    the portion for retaining is configured to be resiliently returnable from the second position to the first position upon removal of the applied force.

4. The connector of claim 3, wherein the housing comprises a sidewall extending around the pin retainer and at least a portion of the ferrule, and the side wall comprises at least one opening therethrough to access the portion for engaging for application of the force to the portion for engaging to move the portion for engaging from the first position to the second position.

5. The connector of claim 4, wherein:
    the alignment pins comprise a first end for being inserted through the passage and into the pin retainer, and a notch disposed adjacent the first end; and
    the portion for engaging comprises a portion for being disposed in the notch to retain the alignment pin with the pin retainer.

6. A pin retainer for a fiber optic connector, the pin retainer comprising:
    a body portion for being disposed with a ferrule in the connector; and
    at least one selectively displaceable locking member configured for locking an alignment pin with the body portion, wherein the selectively displaceable locking member has a first position for engaging an alignment pin to lock an alignment pin with the body portion, and a second position displaced from the first position for release of an alignment pin locked with the body portion, the retainer pin being further configured for interconversion of the connector between the male configuration and the female configuration without disassembly of a housing from the connector.

7. The pin retainer according to claim 6, wherein the selectively displaceable locking member is movable from the first position to the second position under a force applied to the selectively displaceable locking member, and the selectively displaceable locking member is resiliently returnable from the second position to the first position upon removal of the applied force.

8. A method for interconversion of a fiber optic connector between a male configuration comprising at least one alignment pin, and a female configuration comprising at least one passage for receiving an alignment pin, the connector comprising at least one selectively displaceable locking member for locking at least one alignment pin therein, and the method comprising:
    for converting a female configuration to a male configuration, slidably inserting at least one alignment pin into engagement with the selectively displaceable locking member to lock the alignment pin into the connector without disassembly of a housing from the connector; and
    for converting a male configuration to a female configuration, releasing the selectively displaceable locking member from the alignment pin, and slidably removing the alignment pin from the connector without disassembly of a housing from the connector.

* * * * *